US008577558B2

(12) United States Patent
Mitchell

(10) Patent No.: US 8,577,558 B2
(45) Date of Patent: Nov. 5, 2013

(54) SYSTEM AND METHOD FOR VARIABLE STEERING OF AN IMPLEMENT

(75) Inventor: Wade Steven Mitchell, Buckingham, IA (US)

(73) Assignee: Deere & Company, Moline, IL (US)

( * ) Notice: Subject to any disclaimer, the term of this patent is extended or adjusted under 35 U.S.C. 154(b) by 856 days.

(21) Appl. No.: 12/417,254

(22) Filed: Apr. 2, 2009

(65) Prior Publication Data

US 2010/0256871 A1    Oct. 7, 2010

(51) Int. Cl.
G06F 7/00 (2006.01)
A01B 69/00 (2006.01)
B62D 6/00 (2006.01)
G06F 17/00 (2006.01)

(52) U.S. Cl.
USPC .............. 701/50; 701/36; 701/41; 701/48; 701/49

(58) Field of Classification Search
None
See application file for complete search history.

(56) References Cited

U.S. PATENT DOCUMENTS

| | | | |
|---|---|---|---|
| 6,434,462 B1* | 8/2002 | Bevly et al. ................ | 701/50 |
| 7,509,199 B2* | 3/2009 | Rekow ....................... | 701/50 |
| 2005/0288834 A1* | 12/2005 | Heiniger et al. ............ | 701/23 |
| 2006/0282205 A1* | 12/2006 | Lange ......................... | 701/50 |
| 2008/0195268 A1* | 8/2008 | Sapilewski et al. ......... | 701/23 |

FOREIGN PATENT DOCUMENTS

| | | |
|---|---|---|
| DE | 3345231 | 3/1985 |
| EP | 0934562 | 8/1999 |
| EP | 2022306 | 2/2009 |

OTHER PUBLICATIONS

AgGPS True Tracker system. Product Brochure [online], Trimble Navigation Limited. [retrieved Apr. 23, 2009]. Retrieved from the Internet: <URL: http://www.trimble.com/agriculture/truetracker.aspx?dtID=customer-success>.

Swoboda, Rod, On track with RTK. Kansas Farmer [Online]. Sep. 2008 [retrieved on Apr. 23, 2009]. Retrieved from the Internet: <URL: http://magissues.farmprogress.com/ksf/KS09Sep08/ksf018.pdf>.

* cited by examiner

*Primary Examiner* — Khoi Tran
*Assistant Examiner* — Bao Long T Nguyen

(57) ABSTRACT

A system and method for steering an implement comprises a steering detector for detecting a target steering angle associated with an implement steering system. An implement mode detector is capable of determining whether or not the implement is acting in a lowered mode of operation in which a ground-engaging component other than one or more wheels engage the ground. An implement steering controller is arranged to adjust the target steering angle by reducing or by limiting the target steering angle to a maximum steering angle if the implement is in the lowered mode.

15 Claims, 3 Drawing Sheets

SYSTEM AND METHOD FOR VARIABLE STEERING OF AN IMPLEMENT

This document (including all drawings) claims priority based on U.S. provisional application Ser. No. 61/154,198, filed Feb. 20, 2009, and entitled, SYSTEM AND METHOD FOR VARIABLE STEERING OF AN IMPLEMENT under, 35 U.S.C. 119(e).

FIELD OF THE INVENTION

This invention relates to a system and method for variable steering of an implement.

BACKGROUND

An implement may be associated with an active steering system that controls the position of the implement in response to a control signal. However, certain active steering systems fail to consider adequately the physical interaction of the lowered implement with the soil, which can potentially bend or damage components of the implement that engage the soil, or lead to errors in guidance of the implement along a desired path. Accordingly, there is a need for steering of the implement that considers the interaction of the implement with the ground to avoid damage to the implement and tracking error that might otherwise occur.

SUMMARY OF THE INVENTION

A system and method for steering an implement comprises a steering detector for detecting a target steering angle associated with an implement steering system. An implement mode detector is capable of determining whether or not the implement is acting in a lowered mode of operation in which a ground-engaging component other than one or more wheels engage the ground. An implement steering controller is arranged to adjust the steering command such that the target steering angle is reduced by limiting the target steering angle to a maximum steering angle if the implement is in the lowered mode.

DESCRIPTION OF THE PREFERRED EMBODIMENT

Figure 1:
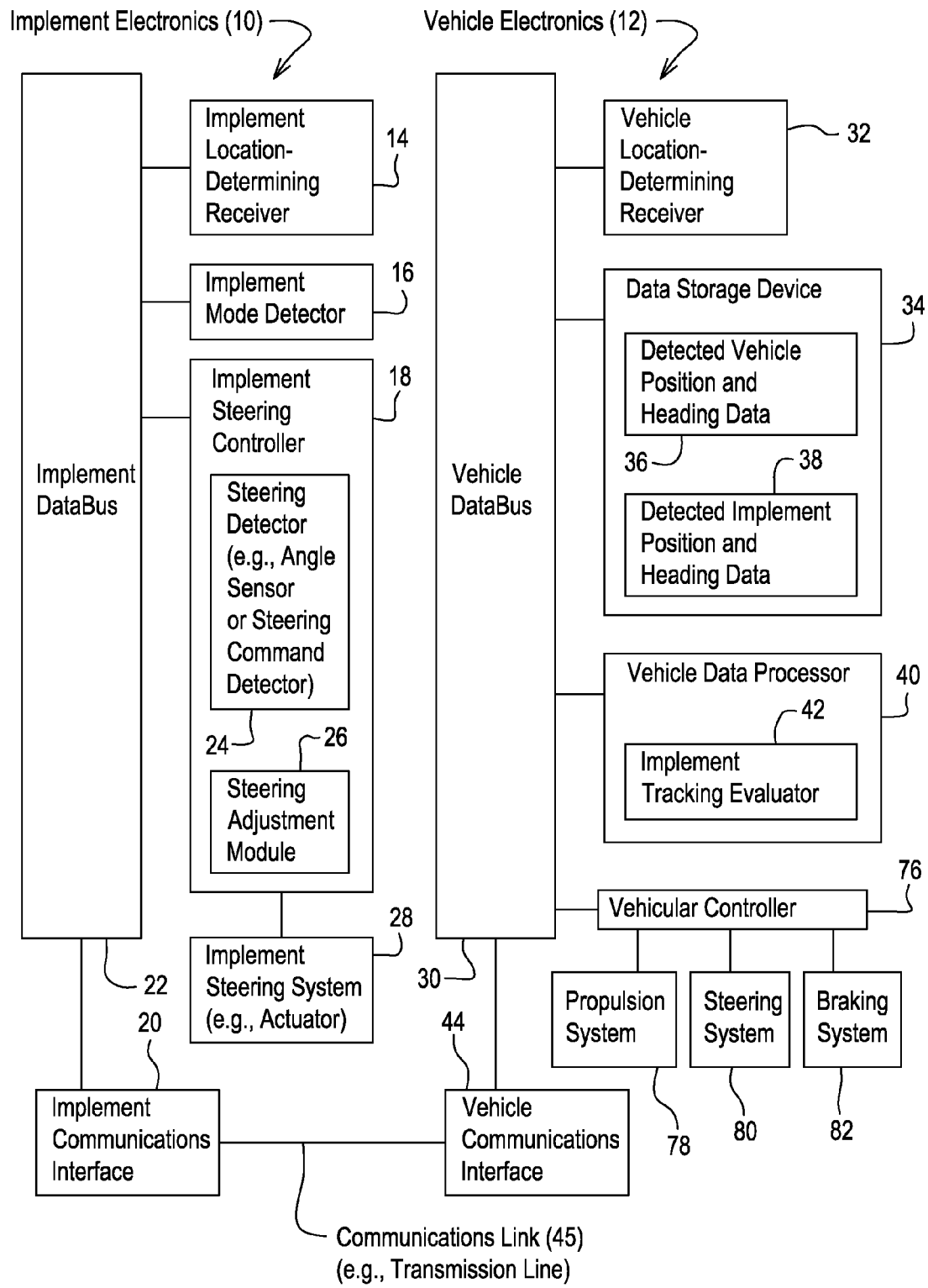
FIG. 1 is a block diagram of one embodiment of a system for variable steering of an implement.

In accordance with one embodiment, the system of FIG. 1 comprises vehicle electronics 12 and implement electronics 10. The vehicle electronics 12 and the implement electronics 10 may communicate with each other via a communications link 45 between a vehicle communications interface 44 and an implement communications interface 20. The vehicle electronics 12 may be carried or mounted on the vehicle (e.g., propulsion unit or tractor). The implement electronics 10 may be carried on or mounted on the vehicle or the implement.

The implement may have wheels or tracks the engage the ground. Further, the implement comprises a ground-engaging portion, a ground-engaging component or a ground-engaging member that engages the ground when the implement is in a lowered mode and does not engage the ground when the implement is in a raised mode or non-lowered mode. The ground engaging members may comprise coulters, discs, harrows. tines, knives, cutting tool, a digger, a plate, a planting member, or another device for plowing, planting, cultivating, cutting, or providing an agronomic function.

In one embodiment, the vehicle electronics 12 carried by the vehicle (e.g., a tractor) comprises a vehicle location-determining receiver 32, a data storage device 34, a vehicle data processor 40, a vehicle controller 76, and a vehicle communications interface 44 coupled to a data vehicle bus. The vehicle data processor 40 may communicate with one or more of the following via the vehicle data bus 30: the vehicle location-determining receiver 32, the data storage device 34, the vehicle communications interface 44, and the vehicle controller 76.

The vehicle location-determining receiver 32 may comprise a global positioning system (GPS) receiver, a GPS receiver with differential correction, or another receiver for receiving location data from satellite or terrestrial reference transmitters. The vehicle location-determining receiver 32 determines a position of the location-determining receiver which is mounted on or carried by the vehicle. The vehicle location determining receiver provides vehicle position data coordinates and heading data 36 for the vehicle. The position data may be expressed in coordinates (e.g., longitude and latitude). The heading may be expressed as an angular bearing with reference to the magnetic or geographic North pole or another reference, for example.

The vehicle data processor 40 comprises a microprocessor, a controller, a microcontroller, a digital logic circuit, a programmable logic array, an application specific integrated circuit (ASIC), or another data processing device. The data processor 40 may further comprise an implement tracking evaluator 40. The implement tracking evaluator 42 may comprise software modules, electronic modules, or any combination of the foregoing.

The data storage device 34 may comprise electronic memory, a magnetic storage device, an optical storage device, a hard disk, non-volatile random access memory, computer memory, or another device for storing data (e.g., digital data). The data storage device 34 stores detected vehicle position and heading data 36 (e.g., provided by the vehicle location determining receiver 32) and detected implement position and heading data (e.g., provided by the implement location-determining receiver 14). The data storage device 34 may store, retrieve or access one or more of the following types of data: detected vehicle position and heading data 36 and implement position and heading data.

The vehicle communications interface 44 may comprise an input/output data port, a communications port, a transmitter, a receiver, a wireline transceiver, or a wireless transceiver. In one embodiment, the vehicle communications interface 44 may comprise buffer memory for storing data that is received from the vehicle data bus 30 or another data source, transmitted to the vehicle data bus 30, or to another data recipient. The input/output data port may comprise a transceiver, such as a universal asynchronous receiver/transmitter.

The vehicular controller 76 may comprise a controller for controlling and interfacing with the steering system 80, the propulsion system 78, and the braking system of the vehicle. The controller 76 may convert or issue steering commands or signals, braking commands or signals, throttle commands to an engine, or control signals to an electric motor from signals responsive to or generated by the vehicle data processor 40.

The implement electronics 10 comprises an implement location-determining receiver 14, an implement mode detector 16, an implement steering controller 18 and an implement communications interface 20 coupled to an implement data bus 22. In turn, the implement steering controller 18 is coupled to an implement steering system 28.

The implement steering controller 18 may communicate with one or more of the following components via the implement data bus 22: the implement location determining receiver 14, the implement mode detector 16, the implement steering controller 18, and the implement communications interface 20.

The implement steering controller 18 may receive differential data based on one or more of the following: a difference between implement position data and vehicle position data, and a difference between implement heading data and vehicle heading data, a planned path of the vehicle, and planned path of the implement. In response to the received differential data, the implement steering controller 18 may generate control data for the implement steering system 28 to control the implement steering system 28 in accordance with the differential data and the planned path of the implement.

The implement steering controller 18 compromises a steering detector 24 and a steering adjustment module 26. In one embodiment, steering detector 24 may comprise a steering wheel angle sensor that detects the angle of a steered wheel of the vehicle (e.g., vehicle pulling or conveying the implement) or a steered wheel of the implement, a steerable hitch, a steerable tongue associated with a hitch assembly, a steerable coulter, or otherwise. In another embodiment, the steering detector 24 receives, intercepts or reads a steering command data from the steering adjustment module 26, or from the vehicle controller 76, or from the steering system 80 of the vehicle, or from any combination of the foregoing devices.

The steering adjustment module 26 or implement controller 18 may steer the implement via the implement steering system 28 with multiple levels (e.g., discrete levels) of aggressiveness that depend upon whether the implement is in a lowered mode or a raised mode (e.g., which is indicated by a signal or data message provided by the implement mode detector 16). In a lowered mode of the implement, the steering adjustment module 26 acts with a lower level of aggressiveness (or with lower, more gradual steering angles) than in a raised mode of the implement. In one embodiment, if the implement steering controller 18 or steering adjustment module 26 is acting at a higher level of aggressiveness with permitted steering angles, the implement steering controller 18 may send a control signal or data message via the implement data bus 22 to an implement level actuator (e.g., an linear motor, servomotor or electro-hydraulic assembly for raising or lowering the implement or a portion or ground-engaging component or member thereof) to delay or postpone lowering of the implement until lateral velocity or lateral acceleration reaches an acceptable level consistent with preventing damage to the implement or its ground-engaging members or components. Although an accelerometer may be a separate device that is coupled to the implement data bus 22 for detecting lateral acceleration of velocity, in practice the implement location-determining receiver 14 may contain an integral accelerometer or gyroscope for detecting lateral acceleration or deriving velocity by integrating the lateral acceleration.

The implement steering system 28 may comprise an electrically controlled steering system, an electro-hydraulic steering system, a solenoid controlled steering system, or another system for changing the direction of one or more wheels or ground-engaging members (e.g., coulters) of the implement. In an alternative embodiment, the steering system may comprise a skid steering system in which differential rotation rates are applied by the propulsion system to different wheels to steer the vehicle.

In yet an alternate embodiment, the implement steering system 28 may comprise an electrically controlled steering system, an electro-hydraulic steering system, or solenoid controlled steering system associated with a steerable hitch, a steerable tongue of an implement hitch, or a steerable members of a towing vehicle attachment points, where the implement steering system 28 is located on the vehicle that tows or provides propulsion for the implement. Accordingly, the implement steering system 28 may be associated with the wheels or ground-engaging coulter of the implement may be located on the tractor or vehicle towing or providing propulsion for the implement.

The actuator of the implement steering system 28 may comprise a hydraulic actuator, an electrical actuator, a linear motor, an electric motor, an electro-hydraulic actuator, a solenoid, a servo-motor, or the like. The actuator imparts force or movement or rotation of one or more wheels of the implement to steer the implement in accordance with command data from the implement steering controller 18.

The implement steering controller 18 may generate a control signal or control data for application to or use by the implement steering system 28. The implement steering controller 18 comprises a device for generating a logic level signal, an analog or digital signal representative of a desired or target steering angle of the steering system (e.g., implement steering system 28), a variable voltage signal, a variable current signal, or any data processing device for controlling the implement steering system 28.

The vehicle controller 76 is capable of communicating via the vehicle data bus 30. The vehicle controller 76 is coupled, directly or indirectly, to the steering system 80. The vehicle controller 76 is capable of generating control signals or control data to control the propulsion system 78, the steering system 80 and the braking system 82 of the vehicle. The vehicle controller 76 may further comprise a logic circuit, a data processing system or another device for generating an analog or digital control signal for the steering system and braking system.

In one illustrative embodiment, the implement electronics 10 and vehicle electronics 12 may function as follows. In the vehicle electronics 12, the vehicle data processor 40 may establish a desired or target path of the implement, a target path of the vehicle, or both. The implement target path may be based on a starting point and a termination point that define a linear segment or a series of interconnected points that form a contour or jagged line. Each point may be define by its coordinates (e.g., longitude and latitude) and stored in the data storage device 34. In the implement electronics 10, the implement steering controller 34 may track the implement target path at a more aggressive level with greater maximum steering angles or at a less aggressive level with lower maximum steering angles to prevent damage to the ground-engaging portion of the implement, for example. At the vehicle electronics 12, the implement tracking evaluator 42 may receive a detected implement position and heading data 38 from the implement location determining receiver 14 or another implement position determining device via the implement communications interface 20, the vehicle communications interface 44, and communications link 45.

In another embodiment, where the implement target steering angles are managed or controlled by the vehicle data processor 40 (e.g., via the implement steering controller 18 and the implement steering system 28) the implement mode detector 16 may transmit status data, message data or a status or message signal to the vehicle data processor 40 or the implement tracking evaluator 42 indicative of whether or not the implement is in a lowered mode (e.g., or in a raised mode). In the lowered mode, one or more ground-engaging members (other than the wheels of the implement) or the implement may contact or engage the ground, whereas in the raised mode, the ground-engaging members of the implement do not contact or engage the ground.

In response to the received, detected implement position and heading data 38 and input of the detected vehicle position and heading data 36 via the vehicle location-determining receiver 32, the implement tracking evaluator 42 determines one or more of the following data, commands or signals: (a) the implement target angle if the implement mode detector 16 indicates that the implement is operating in a raised or non-lowered mode; (b) any revised implement target angle if the implement mode detector 16 indicates that the implement is operating in the lowered mode; (c) any revised implement target angle if the implement mode detector 16 fails to generate a signal or data message and it is unknown whether or not the implement is operating in a raised or lowered mode. The vehicle data processor 40 may communicate any of the above data, commands and signals (e.g., to adjust the implement steering angle to an appropriate level of aggressiveness) to the implement steering controller 18, which in turn controls the implement steering system 28.

In any embodiment where the vehicle data processor 40 controls the implement mode, the implement tracking evaluator 42 and vehicle data processor 40 prevent damage to the ground-engaging portion of the implement when the implement is a ground-engaging mode or when the mode of operation is unknown with respect to whether or not the implement is raised or lowered. Accordingly, the implement target steering angles are managed or controlled by the implement electronics 10, consistent with the commands, data and signals generated by the vehicle data processor 40.

Figure 2:
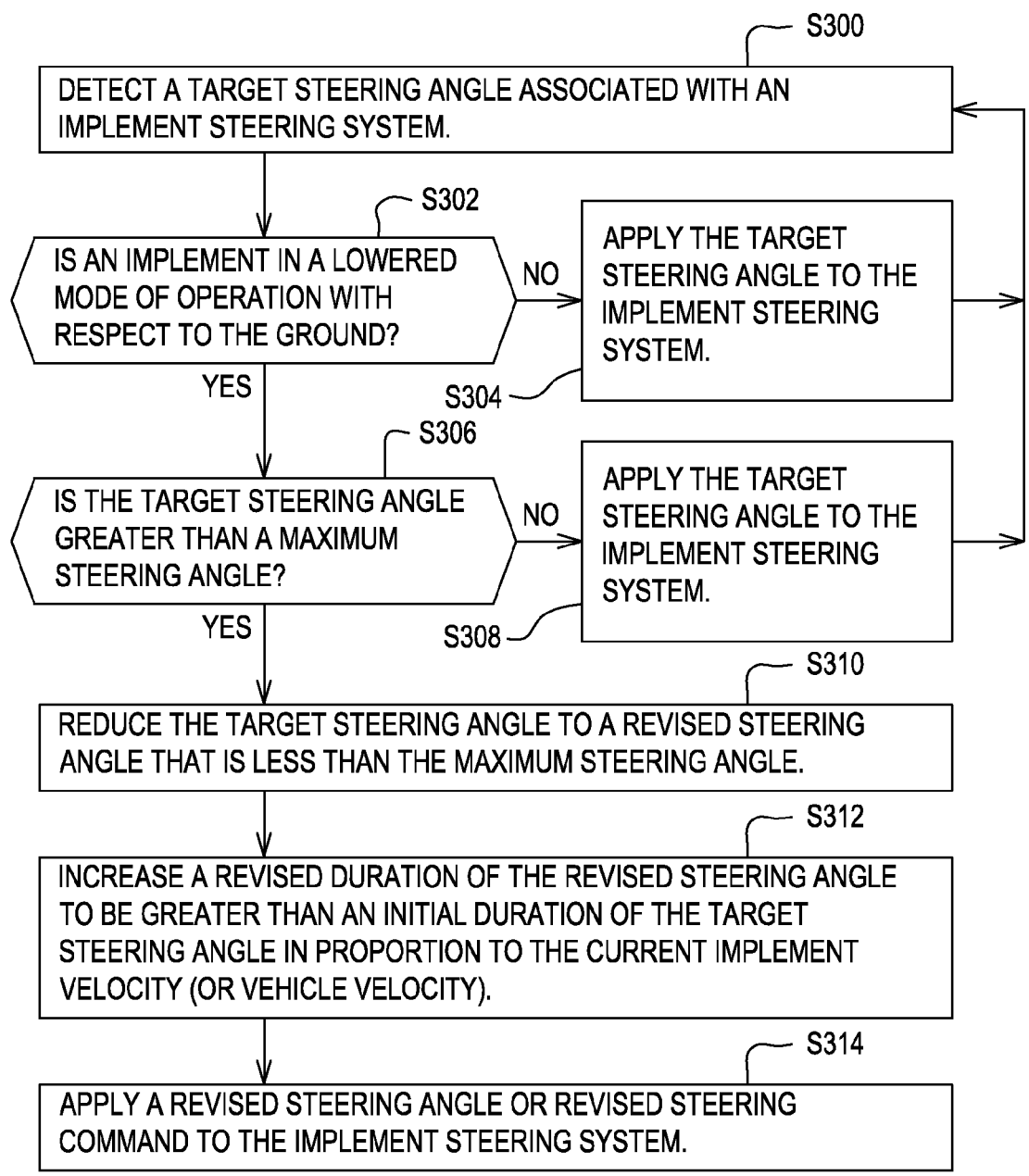
FIG. 2 is a flow chart of one example of a method for variably steering an implement.

FIG. 2 is a method for variable steering of an implement. The method of FIG. 2 begins in step S300.

In step S300, a steering detector 24 detects a target steering angle associated with an implement steering system 28. The steering detector 24 may detect the target steering angle, where the steering command comprises a target steering angle. In one configuration, the steering angle may be detected via an angular sensor (e.g., magnetic field sensor and a magnet mounted on the steerable wheel, a potentiometer, differential evaluation of accelerometers) associated with a steerable wheel of the implement. In another configuration, the steering detector 24 may read, intercept or receive a steering command sent by the vehicle data processor 40 to monitor the current or future target steering angle. In yet another configuration, the steering command, or a derivative thereof, is observed as communicated between the steering adjustment module 26 (or the implement steering controller 18) and the implement steering system 28.

In step S302, an implement mode detector 16 detects whether or not an implement is in a lowered mode of operation with respect to the ground. If the implement mode detector 16 determines that the implement is in a lowered mode of operation, the method continues with step S306. The lowered mode of operation may mean that ground-engaging members of the implement are in contact with the ground or vegetation to be processed. However, if the implement mode detector 16 determines that the implement is not in a lowered mode of operation, the method continues in step S304.

In step S304, an implement steering controller 18 applies the target steering angle to the implement steering system 28. The target steering angle may reside with a steering command or data message.

In step S306, the steering detector 24 or implement steering controller 18 determines if the target steering angle is greater than a maximum steering angle. If the steering detector 24 or implement steering controller 18 determines that the target steering angle is greater than a maximum steering angle, the method continues with step S310. However, if the target steering angle is less than or equal to maximum steering angle, the method continues with step S308.

In step S308, an implement steering controller 18 applies the target steering angle to the implement steering system 28.

In step S310, the steering adjustment module 26 or the implement steering controller 18 limits or reduces the target steering angle to a revised steering angle that is less than the maximum steering angle.

Step S310 may be accomplished by various procedures that may be applied alternately or cumulatively. Under a first procedure, the steering adjustment module 26 or the implement steering controller 18 limits or reduces the target steering angle to a revised steering angle solely based on the target steering angle being greater than the maximum steering angle. Here, the maximum angle may be defined as a factory setting or a field programmable setting for a particular implement based on implement's purpose, weight, weight distribution, center of gravity, dimensions, wheelbase, width, suspension, wheel geometry or other factors.

Under a second procedure for carrying out step S310, the steering adjustment module 26 or the implement steering controller 18 adjusts the target steering angle by reducing or limiting the target steering angle to a maximum steering angle: (a) if the implement is in the lowered mode and (b) if the velocity exceeds maximum velocity, where (c) the target angle is greater than the maximum steering angle as previously determined in step S306.

Under a third procedure for carrying out step S310, the steering adjustment module 26 or the implement steering controller 18 adjusts the target steering angle by reducing or limiting the target steering angle to a maximum steering angle such that the target steering angle is reduced by limiting the target steering angle consistent with a maximum rate of angular change per unit time if the implement is in the lowered mode.

In step S312, the steering adjustment module 26 or implement steering controller 18 increases a revised duration of the revised steering angle to be greater than an initial duration of the target steering angle in proportion to the current implement velocity (or vehicle velocity). The vehicle velocity may be provided by the implement location-determining receiver 14 by measuring time duration between implement positions or by integrating accelerometer data, for example.

In step S314, the implement steering controller 18 applies a revised steering angle or revised steering command to the implement steering system 28. For example, the implement steering controller 18 applies the target steering angle to the implement steering system 28 (e.g., an actuator) for controlling an angular heading or yaw angle of one or more wheels of the vehicle that are controllable on the implement. Under another example, the steering adjustment module 26 or the implement steering controller 18 applies the revised target steering angle (or adjusts the target steering angle) by reducing a gain of the implement steering system 28 such that an angular change per unit time of one or more steered wheels of the implement is limited to the maximum rate of angular change per unit time.

The revised steering angle reduces or eliminates the possibility of damage to the ground-engaging portion of the implement that might otherwise occur. Further, tracking accuracy of the implement can be increased on certain terrain by reducing the incidence of grabbing or slippage of the implement with respect to the ground where implement steering angles are too aggressive.

Figure 3A:
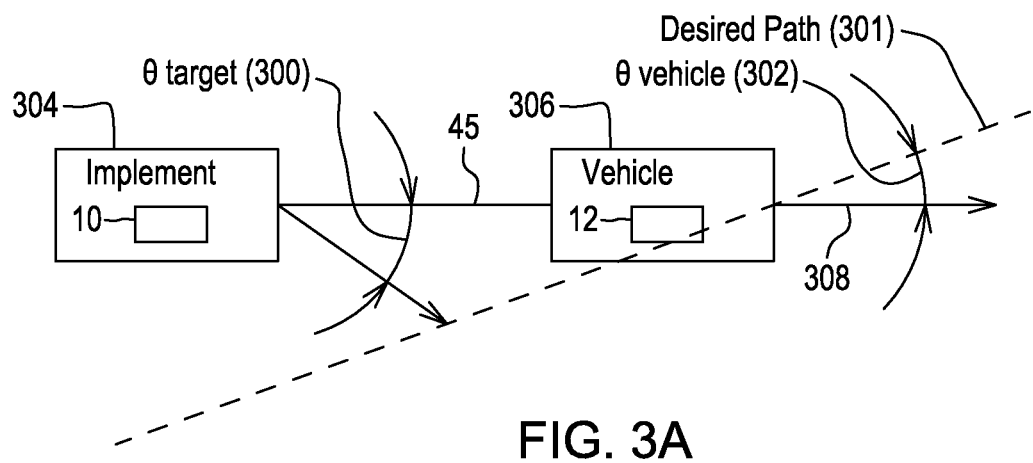
FIG. 3A and FIG. 3B are diagrams that indicate illustrative paths of an implement.

FIG. 3A shows a vehicle that is towing an implement. The vehicle is equipped with the vehicle electronics 12, such as that shown in FIG. 1. The implement is equipped with the implement electronics 10, such as that shown in FIG. 1.

Figure 3B:
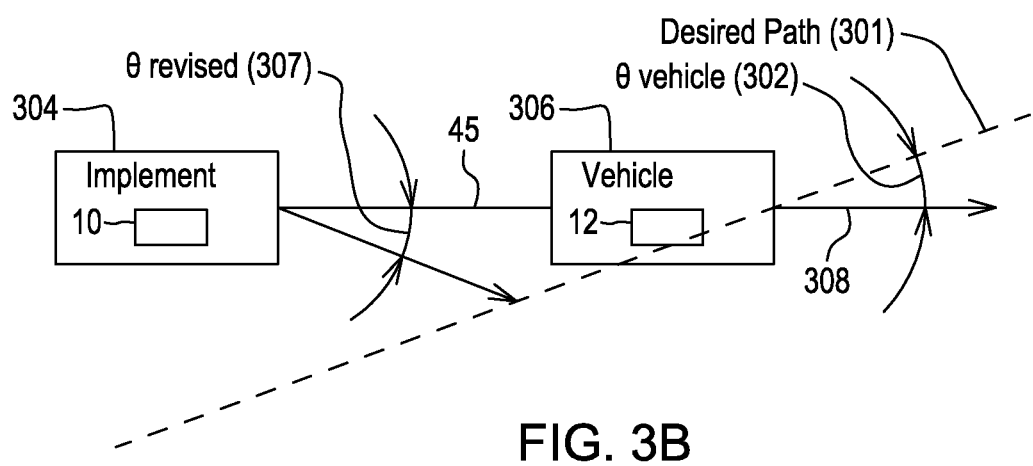

The vehicle target steering angle 302 of the vehicle is indicated as $\theta_{vehicle}$ in FIG. 3A and in FIG. 3B. The vehicle target steering angle 302 ($\theta_{vehicle}$) is measured with reference to the vehicle heading 308. The vehicle target steering angle 302 refers to the difference between the vehicle heading 308 and the desired path 301 (e.g., of the vehicle and the implement) which is shown as a dashed line.

In FIG. 3A, the target steering angle 300 of the implement is indicated as $\theta_{target}$. The target steering angle 300 is measured with reference to the vehicle heading 45. The target steering angle 300 is selected to bring the implement path in alignment with the desired path 301 such that both the vehicle and implement follow approximately the same desired path, with a time lag in the implement following the desired path 301.

In FIG. 3A and FIG. 3B, the vehicle target steering angle 302 ($\theta_{target}$) of the vehicle is the same. The target steering angle 300 ($\theta_{target}$) of FIG. 3A is greater than the revised steering angle 307 of FIG. 3B, such that the revised steering angle 307 ($\theta_{revised}$) is optimized when the implement is in a lowered mode or state to prevent damage to the ground-engaging portion of the implement or tracking error from implement slippage or binding with respect to the ground. The target steering angle 300 of FIG. 3A would theoretically bring the implement in more rapid alignment with the desired path than the revised steering angle 307 of FIG. 3B does with significantly greater risk of damage to the implement or its ground-engaging portion. In an alternate embodiment, the velocity of the vehicle may be increased, but is not necessarily increased, to compensate for the lesser angle of the revised steering angle 307, where more rapid alignment of the implement position is desired.

The implement steering controller 18 or the vehicle data processor 40 advantageously may track the implement target path at a more aggressive level with greater maximum steering angles or at a less aggressive level with lower maximum steering angles to prevent damage to the ground-engaging portion of the implement. For example, the implement steering controller 18 or the steering adjustment module 26 may allow the more aggressive level of greater correction or greater maximum steering angles to track the implement target path if the implement is in a raised mode (indicated by the implement mode detector 16) than if the implement is in a lowered mode. Conversely, the implement steering controller 34 or the steering adjustment module 26 may allow the less aggressive level of lesser correction or lesser maximum steering angles to track the implement target path if the implement is in a lowered mode (indicated by the implement mode detector 16) to prevent damage to the implement, or its ground-engaging members (e.g., from excessive lateral force or acceleration of the greater steering angles).

Having described the preferred embodiment, it will become apparent that various modifications can be made without departing from the scope of the invention as defined in the accompanying claims.

The following is claimed:

1. A method for steering an implement, the method comprising:
    detecting a target steering angle associated with an implement steering system for tracking a planned path;
    determining, by an implement mode detector, whether or not the implement is acting in a lowered mode of operation in which a ground-engaging component, other than one or more wheels, engages the ground, where the implement mode detector transmits status data, message data, a status signal or message signal to a vehicle data processor indicative of whether or not the implement is in the lowered mode where one or more ground-engaging members of the ground engaging-component contact the ground;
    adjusting, by the vehicle data processor, the target steering angle by limiting or reducing the target steering angle to a maximum steering angle if the implement is in the lowered mode to act with a lower level of aggressiveness than in a raised mode of the implement to avoid damage to the ground-engaging members of the implement; and
    wherein in the raised mode, the target steering angle of the implement is allowed to be greater than the maximum steering angle if the implement is in the lowered mode.

2. The method according to claim 1 wherein the adjusting further comprises adjusting the target steering angle such that the target steering angle is reduced if the target steering angle is greater than the maximum steering angle.

3. The method according to claim 1 wherein the adjusting further comprises adjusting the target steering angle such that the target steering angle is reduced by limiting the target steering angle to a maximum steering angle if the implement is in the lowered mode and if the velocity exceeds maximum velocity.

4. The method according to claim 1 wherein the adjusting further comprises adjusting the target steering angle such that the target steering angle is reduced by limiting the target steering angle consistent with a maximum rate of angular change per unit time if the implement is in the lowered mode.

5. The method according to claim 1 further comprising:
    applying the target steering angle to an actuator for controlling an angular heading or yaw angle of one or more wheels of a vehicle associated with the implement.

6. The method according to claim 1 wherein the adjusting of the target steering angle comprises reducing a gain of a steering system such that an angular change per unit time of one or more steered wheels of the implement is limited to the maximum rate of angular change per unit time.

7. The method according to claim 1 further comprising:
    collecting implement position data and implement heading data for an implement via an implement location-determining receiver;
    collecting vehicle position data and vehicle heading data for a vehicle via a vehicle location-determining receiver; and
    determining differential data between the implement position data, the vehicle position data, the implement heading data and the vehicle heading data, calculating the target steering angle for the implement based on the differential data.

8. The method according to claim 1 wherein the detecting comprises detecting the target steering angle by reading or intercepting a steering command comprising the target steering angle.

9. A system for steering an implement, the system comprising:
- a steering detector for detecting a steering angle associated with an implement steering system for tracking a planned path;
- an implement mode detector for determining whether or not the implement is acting in a lowered mode of operation in which a ground-engaging component, other than one or more wheels, engages the ground, where the implement mode detector transmits status data, message data, a status signal or message signal to a vehicle data processor indicative of whether or not the implement is in the lowered mode where one or more ground-engaging members of the ground engaging-component contact the ground;
- an implement steering controller for adjusting the target steering angle by reduced or limiting the target steering angle to a maximum steering angle if the implement is in the lowered mode to act with a lower level of aggressiveness than in a raised mode of the implement to avoid damage to the ground-engaging members of the implement; and
- wherein in the raised mode, the target steering angle of the implement is allowed to be greater than the maximum steering angle if the implement is in the lowered mode.

10. The system according to claim 9 wherein the implement steering controller further comprises a steering adjustment module for adjusting the target steering angle such that the target steering angle is reduced if the target steering angle is greater than the maximum steering angle.

11. The system according to claim 9 wherein the implement steering controller further comprises a steering adjustment module for adjusting the target steering angle such that the target steering angle is reduced by limiting the target steering angle to a maximum steering angle if the implement is in the lowered mode and if the velocity exceeds maximum velocity.

12. The system according to claim 9 wherein the implement steering controller further comprises a steering adjustment module for adjusting the target steering angle such that the target steering angle is reduced by limiting the target steering angle consistent with a maximum rate of angular change per unit time if the implement is in the lowered mode.

13. The system according to claim 9 wherein the implement steering controller is configured to send an adjusted target steering angle to an actuator for controlling an angular heading or yaw angle of one or more wheels of a vehicle associated with the implement.

14. The system according to claim 9 wherein the implement steering controller further comprises a steering adjustment module for reducing a gain of a steering system such that an angular change per unit time of one or more steered wheels of the implement is limited to the maximum rate of angular change per unit time.

15. The system according to claim 9 further comprising:
- an implement location-determining receiver for collecting implement position data and implement heading data for an implement;
- a vehicle location-determining receiver for collecting vehicle position data and vehicle heading data for a vehicle; and
- a data processor for determining differential data between the implement position data, the vehicle position data, the implement heading data and the vehicle heading data, the data processor arranged to calculate the target steering angle for the implement based on the differential data.

* * * * *